United States Patent [19]

Takeda et al.

[11] Patent Number: 4,748,678
[45] Date of Patent: May 31, 1988

[54] METHOD OF STORING AND RETRIEVING IMAGE DATA

[75] Inventors: Haruo Takeda, Kawasaki; Kuniaki Tabata, Nishitama; Tetsuo Machida, Sagamihara; Masatoshi Hino, Yokohama; Kunihiro Nomura, Kawasaki, all of Japan

[73] Assignee: Hitachi, Ltd., Tokyo, Japan

[21] Appl. No.: 863,242

[22] Filed: May 14, 1986

[30] Foreign Application Priority Data

May 22, 1985 [JP] Japan ............................ 60-108122

[51] Int. Cl.⁴ .............................................. G06K 9/00
[52] U.S. Cl. ...................................... 382/56; 382/61; 364/518
[58] Field of Search ............................ 382/57, 61, 56; 358/102, 256; 364/518

[56] References Cited

U.S. PATENT DOCUMENTS

| | | | |
|---|---|---|---|
| 4,300,123 | 11/1981 | McMillin et al. | 382/61 |
| 4,403,339 | 9/1983 | Wevelsiep et al. | 382/61 |
| 4,408,181 | 10/1983 | Nakayama | 382/61 |
| 4,538,182 | 8/1985 | Saito et al. | 382/57 |
| 4,553,261 | 11/1985 | Froessl | 382/61 |
| 4,574,395 | 3/1986 | Kato | 382/56 |
| 4,633,506 | 12/1986 | Kato | 382/56 |
| 4,636,848 | 1/1987 | Yamamoto | 358/102 |
| 4,653,021 | 3/1987 | Takagi | 382/56 |

Primary Examiner—Leo H. Boudreau
Attorney, Agent, or Firm—Antonelli, Terry & Wands

[57] ABSTRACT

In order to utilize memo data written by hand for purposes of retrieving a document, the original document image data is stored and, thereafter, a document image data with memo is separately input, the document image data with memo being comprised of the original document image onto which is additionally written memo data by hand. The position of the document image data with memo is then brought into alignment with the original document image data and is correlated to extract only that memo data which has been written by hand. Then the kind of memo is discriminated, the process is effected depending upon the kind of memo, and the memo data is stored in a secondary data file for retrieval. To retrieve the document, the memo data of a plurality of documents is read out from the secondary data file depending upon the kind of memo that is designated, and is displayed as a look-up table. If the operator designates any one of them, the image of the corresponding original document is read out from the original document image file and is displayed.

16 Claims, 10 Drawing Sheets

TB1

| MEMO NO. | HEIGHT | WIDTH | WIDTH/ HEIGHT | WIDTH + HEIGHT | NUMBER OF PICTURE ELEMENT | CLASIFICATION OF MEMO |
|---|---|---|---|---|---|---|
| 1 | 35 | 30 | 0.86 | 65 | 0 | NOTES |
| 2 | 35 | 25 | 0.71 | 60 | 0 | NOTES |
| 3 | 35 | 25 | 0.71 | 60 | 0 | NOTES |
| 4 | 15 | 195 | 13.0 | 210 | 0.01 | UNDER LINE |
| 5 | 5 | 10 | 2.0 | 15 | 0 | NOISE |
| 6 | 75 | 140 | 1.9 | 215 | 0.25 | BOX |

FIG. 11

| IMAGE NO. | CLASS CODE | KEY WORD | NOTES | | | | UNDER LINE | | | | | | | | BOX | | | | | |
|---|---|---|---|---|---|---|---|---|---|---|---|---|---|---|---|---|---|---|---|---|
| | | | $x_0$ | $y_0$ | $x_1$ | $y_1$ | P | $x_0$ | $y_0$ | $x_1$ | $y_1$ | $x_2$ | $y_2$ | $x_3$ | $y_3$ | $x_0$ | $y_0$ | $x_1$ | $y_1$ | CHARACTER CODE | POINTER |
| 1 | | | | | | | | | | | | | | | | | | | | | |
| 2 | | | | | | | | | | | | | | | | | | | | | |
| 3 | | | | | | | | | | | | | | | | | | | | | |
| .... | | | | | | | | | | | | | | | | | | | | | |

91 — IMAGE NO. column
92 — NOTES
93 — UNDER LINE
94 — (section)
95 — BOX / CHARACTER CODE
96 — POINTER
90 — table

FIG. 12

| TITLE | APPL. NO. | ASSIGNEE | |
|---|---|---|---|
| IMAGE RETRIEVAL METHOD | 58 – 123 | A CORP. | |
| FILING SYSTEM | 58 – 334 | B LTD. | 50 |
| RETRIEVAL SYSTEM | 59 – 001 | HITACH | |
| ⋮ | ⋮ | | |

| TITLE | UNDER LINE | |
|---|---|---|
| IMAGE RETRIEVAL METHOD | AN IMAGE WITH MEMO ········ RECOGNITION ⋮ | |
| FILING SYSTEM | SYNCHRONIZED DISPLAY ······ OPTICAL DISC ⋮ | 51 |
| RETRIEVAL SYSTEM | ⋮ | |

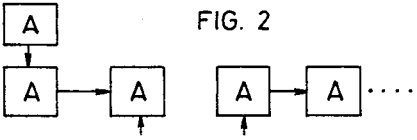

| TITLE | FIGURE | |
|---|---|---|
| IMAGE RETRIEVAL METHOD | | |
| FILING SYSTEM | ⋮ | 52 |
| RETRIEVAL SYSTEM | ⋮ | |

| TITLE | NOTES | |
|---|---|---|
| IMAGE RETRIEVAL METHOD | *The embodiment may be patentable.* ⋮ | |
| FILING SYSTEM | *Talk with Mr. A and Mr. B* ⋮ | 53 |
| RETRIEVAL SYSTEM | ⋮ | |

METHOD OF STORING AND RETRIEVING IMAGE DATA

BACKGROUND OF THE INVENTION

1. Field of the Invention

The present invention relates to a method of storing and retrieving image data. More specifically, the invention relates to a method of storing secondary data, such as memos added to a document image as index data relating to the document image, and to a method of retrieving a document image by utilizing the secondary data.

2. Description of the Prior Art

Accompanying the recent trend toward putting into practice an optical disc device which is capable of storing large amounts of data, attention has been given to a document image filing system as a new document control means to electronically file document data and to retrieve the data by using a display device. If the content of a document is treated as an image, the document which includes figures and photographs in addition to characters can be electronically filed. Therefore, a wide range of documents, such as general literature, books and slips, design drawings, written contracts, and the like can be stored in a memory device.

According to a conventional retrieval system, index data, such as names of the documents, classification codes, keywords and the like are registered through a keyboard to identify the document images. To retrieve the data, a user designates the index data so that the contents of the corresponding document are produced on the display device. A system of this type has been disclosed, for example, in a journal "Nikkei Computer" published by Nikkei McGraw-Hill Co., Dec. 26, 1985, pp. 62-64. Since items common to each of the documents have been selected, the above-mentioned retrieval data is not helpful to directly retrieve a document that is being sought if the user does not remember the name of the literature or the keyword or if he remembers them vaguely. In this case, the document images are displayed successively to retrieve the correct one by visual inspection.

As a method to facilitate the retrieval of the document image, the applicant of the present invention has proposed a method of retrieving an image in Japanese Patent Application No. 55073/1983 (Japanese Patent Laid-Open No. 183458/1984, U.S. Ser. No. 594690) according to which secondary reference data, such as memos specific to the image data are registered, and the image data is specified with reference to the thus registered data at the time of retrieval.

SUMMARY OF THE INVENTION

The object of the present invention is to provide a method of storing secondary data such as memos which the user has added to the document, and a method of retrieving the image data by utilizing the secondary data.

Another object of the present invention is to provide a method of storing image data which is capable of storing a given region of the document image as an index for retrieving the document image, and a method of retrieving the document image by utilizing the index.

To achieve the above-mentioned objects, the method of storing document image data in a filing system of the present invention comprises:

a first step for preparing a processed image which includes the content of an original document in a first memory region of the filing system and a second data;

a second step for comparing the processed image with the image of the original document read from said first memory region, in order to find different portions;

a third step for classifying the different portions according to a predetermined classification standard;

a fourth step for specifying at least one local region which has a predetermined relationship in position, that is determined by the classification standard, with respect to the different portion in the processed image; and a fifth step for storing the data that represents the local region in a second memory region of the filing system together with a code that makes said data corresponded to the original document.

The secondary data may include memos written by the user on the document, and/or marks such as underlines and boxes or surrounding marks attached to particular words and description in the document. The data that represents the local region includes position coordinates of the local region, a document image in the local region, and character codes obtained by discriminating the characters contained in the local region. The data that represent the local regions is rearranged for every classification section of the secondary data, and is stored in the second memory region.

According to the method of retrieving a document image of the present invention, the user designates a classification section of the secondary data, so that the contents of a local region in the document image or the contents of memo data corresponding to the underlined portion are displayed in the form of a look-up table or list on the display device, and the user then selects one of the secondary data that is displayed. Through the select operation, a document image corresponding to the selected secondary data is read from the first memory region and is displayed.

According to the present invention, the user inputs the processed document to easily prepare a secondary data file that corresponds to the document which has been registered in the filing system. The image in a major portion of the processed document has been stored in the file of the original document. Therefore, in the secondary data file there needs be stored the information added by the user or the image of a portion of the original document related thereto. Therefore, the secondary data file may be made up of a personal file, such as a floppy disc having a small memory capacity. According to the present invention, a plurality of users are allowed to have their own secondary data files without changing the contents of the common file in which are stored images of the original documents, and are hence allowed to quickly take out desired document images from the common image file with reference to their own memo data stored in the secondary data file.

The foregoing and other objects, advantages, manner of operation and novel features of the present invention will be understood from the following detailed description when read in connection with the accompanying drawings.

BRIEF DESCRIPTION OF THE DRAWINGS

FIG. 11 is a diagram showing a format of a secondary data file;

FIG. 12 is a diagram showing the contents of display in retrieving the image according to the present invention;

DESCRIPTION OF THE PREFERRED EMBODIMENTS

The invention will now be described by way of various embodiments.

Figure 1:
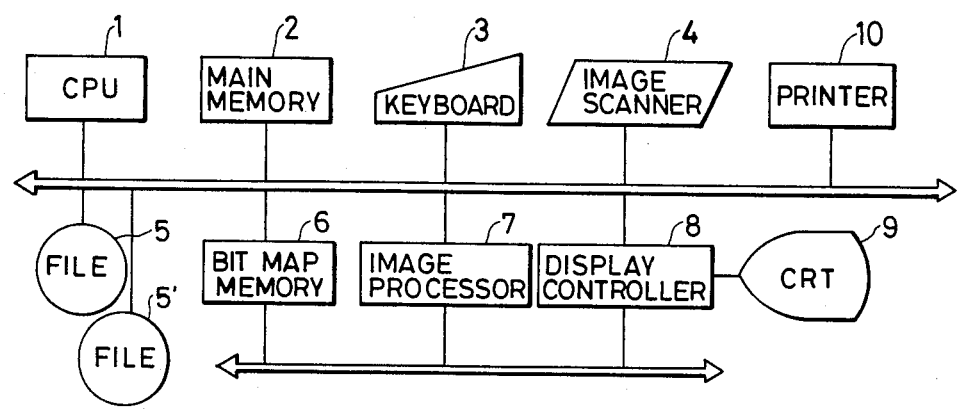
FIG. 1 is a block diagram illustrating an image processing system according to an embodiment of the present invention.

FIG. 1 shows a system for retrieving document image data to which the present invention is adapted, wherein reference numeral 1 denotes a microprocessor (CPU), 2 denotes a main memory (MM), 3 denotes a keyboard (KB), 4 denotes an image scanner (IS), 5 and 5' denote filing devices (FD), 6 denotes a bit map memory (BM), 7 denotes an image processor (IP), 8 denotes a display controller (DC), 9 denotes a CRT display, and 10 denotes a printer (PR).

Figure 2:
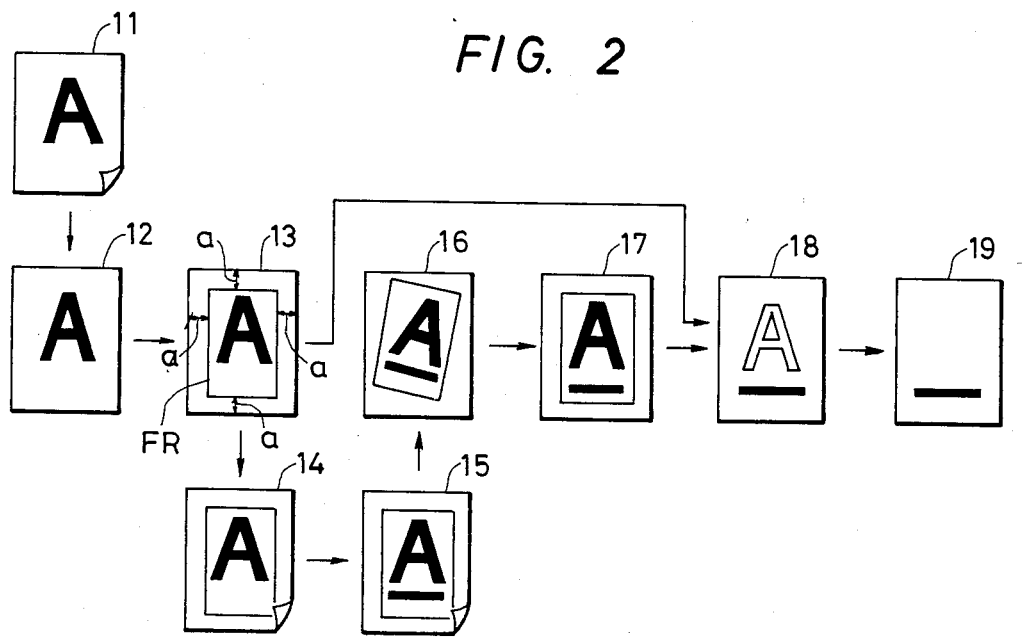
FIG. 2 is a diagram which schematically illustrates a process for extracting the secondary data from the processed document.

First, described below is the processing for extracting the secondary data (memo portion) only from the processed image (hereinafter referred to as an image with memo) to which secondary data such as a memo is added. FIG. 2 is a diagram which schematically illustrates the process for extracting the secondary data. First, an original document 11 is taken from the image scanner 4 into the bit map memory 6 to obtain an original image 12. The original image 12 is stored in the file 5 which consists, for example, of an optical disc. In order to align the positions of two images that will be described later, the image processor 7 writes a rectangular frame FR at a predetermined position on the original image 12 depending upon the instruction from the CPU 1 to thereby prepare an image 13 with frame which will be produced by the printer 10 as an original paper 14 for processing the document. A memo (e.g., underline) is added onto the original paper 14 to prepare a processed document 15 with memo. The processed document 15 is read by the image scanner 4 and is input as an image with memo 16 to a region different from the region where the image 13 with frame has been stored on the bit map memory 6. With an ordinary image scanner, it is difficult to completely convert the paper surface into an image thereof without rotation or skew. The printer 10 and the image scanner 4 usually have different picture element densities. In order to bring the skew and size of the image 16 with memo into agreement with those of the image 13 with frame, therefore, the normalization is effected by using, for example, the rectangular frame FR to obtain a normalized image 17. Then, the image 13 with frame and the normalized image 17 are matched with each other, to obtain a differential image 18 in which are left non-coincident portions only. The differential image contains, in addition to memo data, deterioration data of the original image caused by passing the image 13 with frame through the processor 10 and the image scanner 4. Finally, the deterioration data is removed from the differential image 18 to obtain a memo image 19 which contains memo data only. The above-mentioned processing is wholly controlled by the CPU 1, and the individual image processings are performed by the image processor 7 according to the instruction from the CPU 1. The image processings by the image processor 7 will now be described in detail.

When the image 13 with frame is to be prepared from the original image 12, the rectangular frame FR that serves as an indication of reference position is described at a position maintaining a predetermined distance "a" from the edge of the original image 12. The rectangular frame FR may be replaced by another mark that indicates the position. To draw straight lines of the rectangular frame FR on the bit map memory 6, the element patterns of the lines should be written successively in the up and down direction and in the right and left direction. In the write processing of the rectangular frame, black picture elements of the regions outside the frame FR on the original image 12 are all converted into white picture elements so that the normalization processing can be carried out conveniently as will be described later.

In the processing for preparing the normalized image 17 from the image 16 with memo, a step is carried out to find the skew of the image 16 with memo by detecting four straight lines that constitute the rectangular frame FR, and a step is further carried out to convert the coordinates of the whole image in order to correct the skew of the image 16 with memo and to correct, depending upon the cases, the size thereof, such that the rectangular frame of the image 16 with memo and the rectangular frame of the image 13 with frame are brought into agreement with each other.

Straight lines constituting the rectangular frame FR can be detected by a variety of known methods. As one of such methods, use is made of a known algorithm based on Hough conversion.

Figure 3:
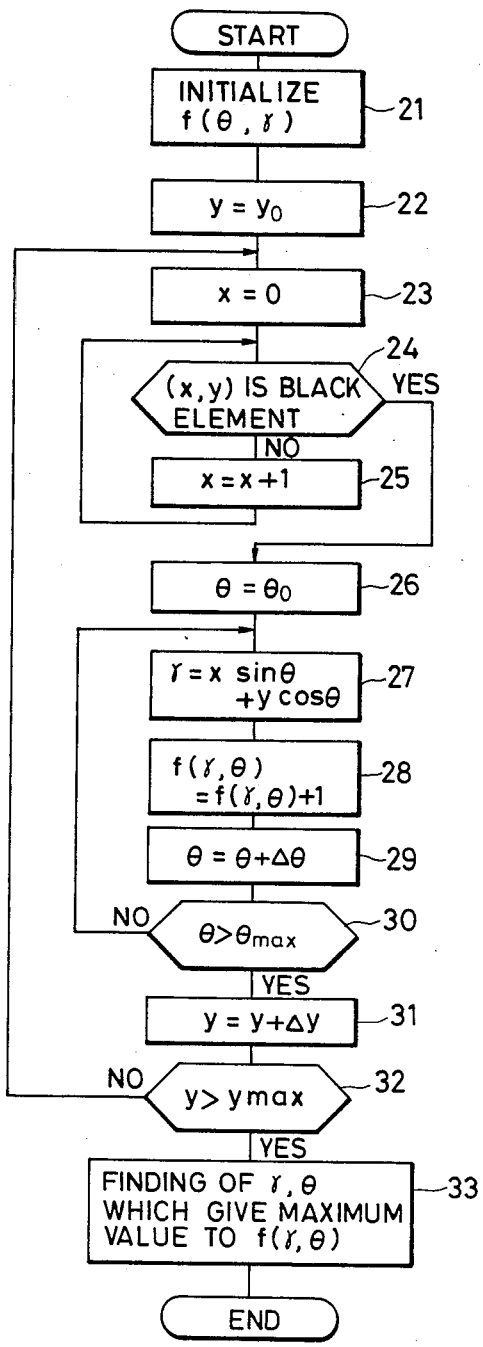
FIG. 3 is a program flow chart illustrating the procedure for finding straight lines contained in an image.
Figure 4:
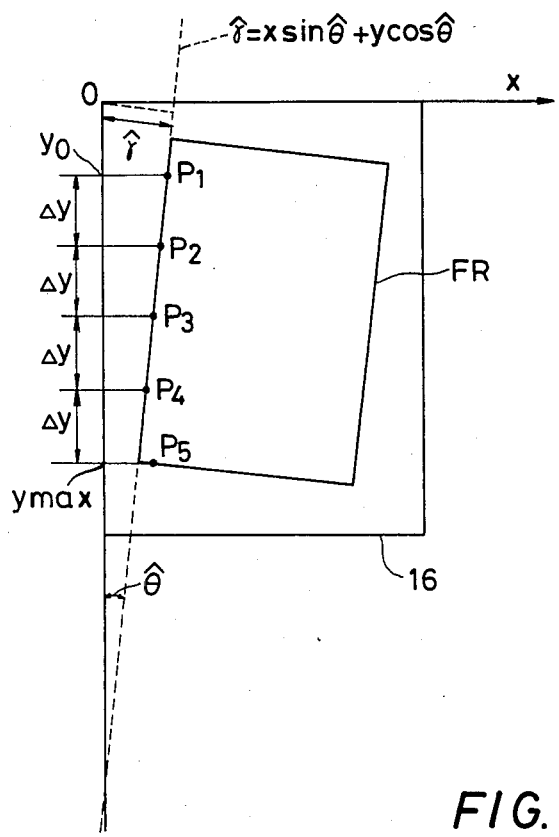
FIG. 4 is a diagram explaining how to detect straight lines in relation to FIG. 3.

FIG. 3 is a program flow chart for detecting a vertical line located on the left side among the four straight lines of the rectangular frame FR, and FIG. 4 is a diagram to explain the detection of the line. In FIG. 4, $\hat{\gamma} = x \sin \theta + y \cos \theta$ is an equation of the straight line that is to be found, wherein $\hat{\gamma}$ denotes a distance from the origin 0, and $\theta$ denotes a skew of the straight line. The feature of Hough conversion is that the straight lines can be detected irrespective of partial noise date in the image. The outline of this algorithm is as described below. That is, in the flow chart of FIG. 3, a candidate of a point such as a black picture element $P_1$ is found on a straight line in the steps 23 to 25. In the steps 26 to 30, sets of $\gamma$ and $\theta$ according to the equation $\gamma = x \sin \theta + y \cos \theta$ are found as straight lines that pass through this point P₁. Then, the steps 23 to 32 are repeated to find a frequency distribution f(γ, θ). Here, f(γ, θ) represents the number of candidate points located on the straight line γ=x sin θ+y cos θ. In FIG. 4, for instance, the value f(γ, θ) of straight line (γ, θ) passing through points P₁ to P₄, is 4. As for other straight lines (γ, θ), the value f(γ, θ) is as small as 0 to 2. By finding $\hat{\gamma}$ and $\hat{\theta}$ that render the value f(γ, θ) maximum in the step 33, therefore, there can be obtained a parameter of straight lines that pass through the greatest number of candidate points. Equations of the right, upper and lower straight lines of the rectangular frame FR are then found in the same manner as described above.

Left upper, right upper, left lower and right lower corner points of the rectangular frame FR are found from the intersecting points of these four straight lines, and are denoted as (0, 0), (M₁, N₁), (M₂, N₂), (M₁+M₂, N₁+N₂) to form a new coordinate system with the left upper corner point as the origin. Described below is a step for converting the whole image 16 with memo by utilizing the rectangular frame FR. If four corner points of the image 13 with frame are denoted by (0, 0), (m, 0), (0, n) and (m, n), the conversion from the image 16 into the image 17 can be expressed as, $$\begin{pmatrix} X \\ Y \end{pmatrix} = \begin{pmatrix} M_1/m & M_2/n \\ N_1/m & N_2/n \end{pmatrix} \begin{pmatrix} x \\ y \end{pmatrix}$$

where (x, y) represents the coordinate of a picture element of the image 16 with memo, and (X, Y) represents the coordinate of a picture element that corresponds to (x, y) in the normalized image 17.

A coordinate (x, y) corresponding to a lattice point (X, Y) is found according to an equation, $$\begin{pmatrix} x \\ y \end{pmatrix} = \frac{1}{M_1N_2 - M_2N_1} \begin{pmatrix} mN_2 & -mM_2 \\ -nN_1 & nM_1 \end{pmatrix} \begin{pmatrix} X \\ Y \end{pmatrix}$$

Figure 5:
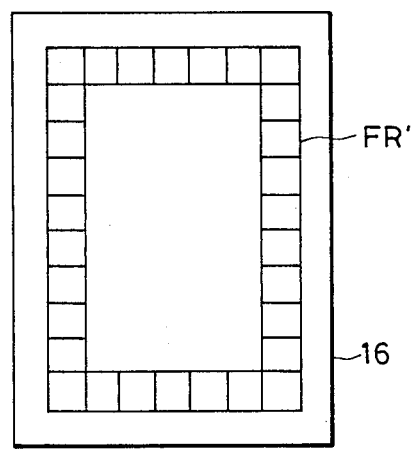
FIG. 5 is a diagram showing another embodiment of a rectangular frame for correcting the skew.

Generally, however, the coordinate (x, y) does not serve as a lattice point on which a picture element exists. Therefore, a fraction over ½ is counted as one and the rest is disregarded to find an integer in order to use a value of a lattice point which is closest thereto, or the logical sum of concentrations of the surrounding lattice points is interpolated to find a concentration that is to be used as the concentration at (x, y). In the foregoing there was described an embodiment to utilize the outer frame constituted by four lines as a mark for aligning the position. However, methods can further be contrived to achieve a matching by attaching characteristic points to the four corners, and to achieve the matching relying upon the characteristic points of the original document without adding any particular marks. In the foregoing there was described a case based on the prerequisite that the distortion caused by the difference in the picture element density between the printer 10 and the image scanner 4 was linear. With an apparatus of the type in which a line sensor of the image scanner 4 is driven by a motor, however, there may develop non-linear distortion being caused by the drive speed which is not constant. In this case, use is made of a sectionalized frame FR' as shown in FIG. 5, change in the distance is detected relying upon a plurality of parallel lines forming the sections, and the aforementioned conversion is performed with a small region as a unit, in order to obtain a normalized image maintaining a high precision.

Described below is a process for preparing a differential image 18 from the image 13 with frame and the normalized image 17. The differential image can be easily prepared by comparing the image 13 having frame with the normalized image 17 with a picture element as a unit, and rendering the noncoincident portions black and the coincident portions white. To distinguish the memo data over the noise, however, the procedure should be carried out as described below.

Figure 6:
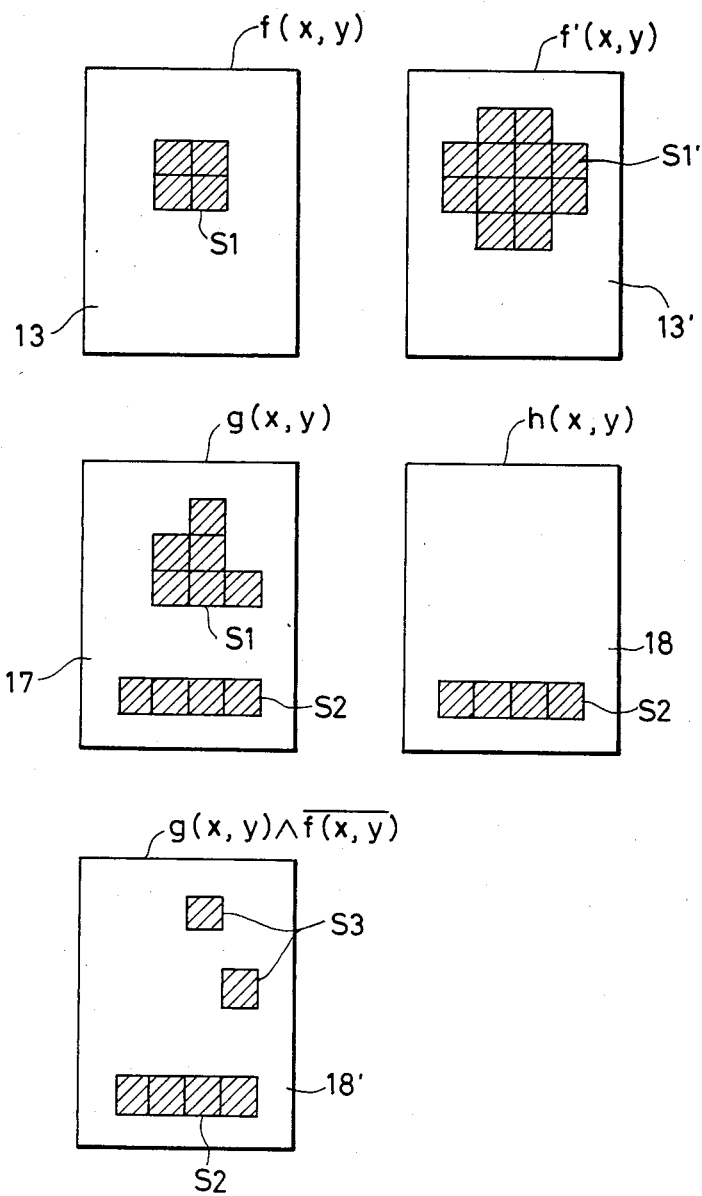
FIG. 6 is a diagram explaining how to extract the difference between an original document image 13 and a processed image 17.

In FIG. 6, reference numeral 13 denotes an image with frame having a pattern S1, 17 denotes a normalized image having a pattern S1 that is deformed by noise and having a pattern S2 added as memo data, 13' denotes an image 13' with frame which is processed to expand the pattern S1, 18 denotes a differential image obtained from the images 13' and 17, and 18' denotes a differential image obtained from the images 13 and 17. Now, if the concentrations of given picture elements (x, y) of the image 13 with frame and of the normalized image 17 are denoted by f(x, y) and g(x, y), the image being a binary image, the concentration of the black picture element being denoted by "1" and the concentration of the white picture element being denoted by "0", then the image 13' is obtained by performing the operation, $$f'(x,y) = f(x,y) \cup f(x+1,y) \cup f(x,y+1) \cup f(x+1,y+1)$$

for all values of x and y.

By using the image 13' with frame in which the black picture element region is expanded as mentioned above, and finding regions which have black picture elements in the normalized image 17 and white picture elements in the expanded image 13', there is obtained a differential image 18 which contains memo data S2 only. The above processing is expressed by the following equation, $$h(x,y) = g(x,y) \cup \overline{f'(x,y)}$$

As will be obvious from a comparison of the image 18 with the differential image 18' which indicates noncoincident portions between the image 13 and the normalized image 17, the expansion processing makes it possible to produce a differential image which is free from noise region S3 added to the initial pattern S1 or the portions missing from the initial pattern, that are caused as the image is passed through the printer 10 and the image scanner 4.

In the above embodiment, the expansion processing was performed based upon the logical sum of the neighboring four picture elements. It is, however, allowable to expand the logical sum to include the neighboring nine picture elements, the neighboring 16 picture elements, and so on. Depending upon the kind of memo to be treated, furthermore, the expansion processing can be eliminated.

A process for preparing a memo image 19 from the differential image 18 will now be described. This process is to remove noise from the memo data that has noise which could not be removed by the above-mentioned process. Here, it is presumed that the noise has a line width smaller than that of the memo data, and the noise is removed by the contraction conversion, and the line width of the memo data is restored by the expansion conversion. The differential image 18 is denoted by h(x, y). First, the black region of the differential image 18 is contracted. The contraction is realized by effecting the operation $$h'(x,y)=h(x,y) \cap h(x+1,y) \cap h(x,y+1) \cap h(x+1,y+1)$$

for all values of x and y. Then, the black region of the contraction image h'(x, y) is expanded in the same manner as the aforementioned f'(x, y). Depending upon the line width of noise, the expansion may be effected to include the neighboring nine picture elements, the neighboring 16 picture elements, and so on, instead of the logical sum or the logical product of the neighboring four picture elements. In the process to find the differential image, it often happens that the memo data is cut off due to the process for expanding the image 13 with frame. This defect, however, can be interpolated by effecting the expansion conversion and then the contraction conversion prior to effecting the abovementioned process of contraction and expansion.

Described below is a process which discriminates the kind of memo data to prepare a secondary data file depending upon the kind of memo data.

Figures 7, 8:
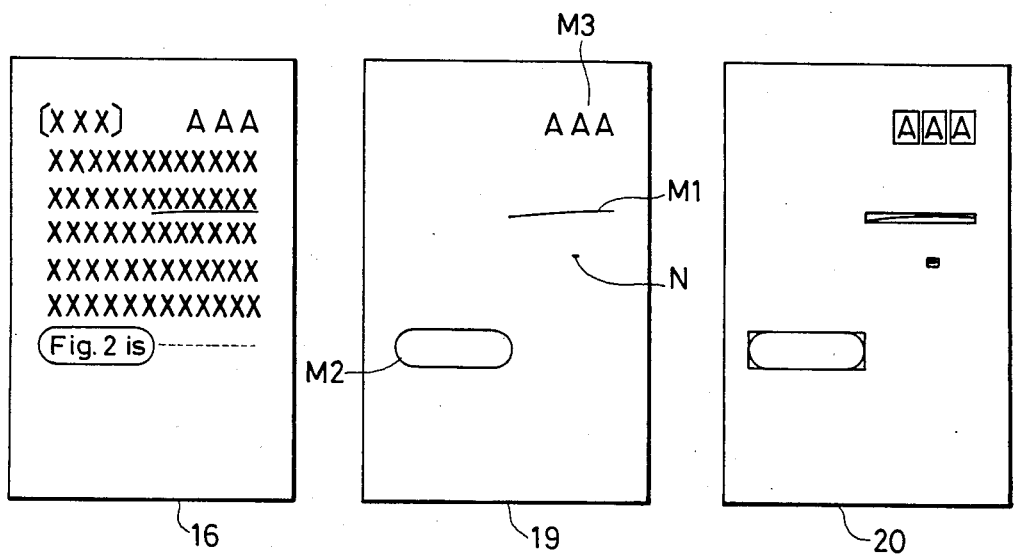
FIG. 7 is a diagram explaining the classification of the secondary data or the memo data.
FIG. 8 is a data table used for the classification of the secondary data.

FIG. 7 shows a relationship among a processed image 16 to which memo data is added, wherein X represents arbitrary characters, a memo image 19, and a divided-region image 20 in which a circumscribing rectangle is found for each region of continuous black picture elements in the memo image 19. Here, the memo data includes three types of data, i.e., underline M1, box or surrounding mark M2, and notes M3. In addition to these memo data, the memo image 19 contains noise N that was not removed from the differential image by the conversion into memo image the step of classifying the memo data that will be described later.

First, described below is a process for preparing the divided-region image 20 from the memo image 19. Here, the image is divided into units of regions of continuous black picture elements. A memo number is attached to each of the regions. A variety of algorithms have heretofore been proposed to cut out the continuous region. The continuous region can be cut out, for example, by the labelling algorithm disclosed in a paper entitled "Pattern Data Processing" by Makoto Nageo, the Japanese Association of Electronic Communications, 1983, p. 84. Labels 1 to 6 attached to the individual regions are memo numbers in a column 40 of region table TB1 as shown in FIG. 8. The heights of the regions are calculated from the coordinates of the uppermost and lowermost portions of the regions, and are written onto a column 41 of the table. The widths are also calculated from the coordinates of the leftmost and rightmost portions, and are written onto a column 42.

The region table TB1 is prepared in a work area in the main memory 2.

The memory data is classified by calculating a variety of parameters based upon the data of circumscribing rectangles found by dividing the region, and comparing them with predetermined classification standards. In this example, there are three classification parameters that are stored in the columns 43 to 45 of the table TB1.

A first parameter stored in the column 43 is defined by the width/height of the region and represents a ratio of the height to the width of the region. In the case of the "underline", the value of the first parameter becomes greater than that of other memo data. Depending upon the value of the first parameter, therefore, the underline can be discriminated from other memo data.

Figure 9:
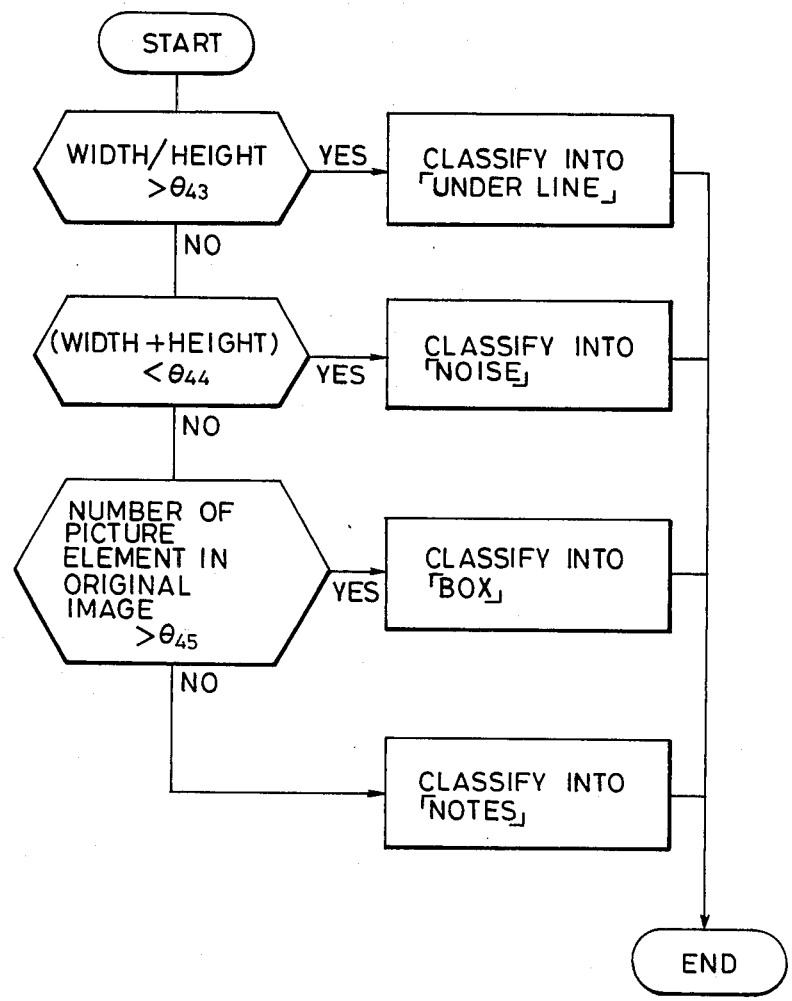
FIG. 9 is a program flow chart illustrating the procedure for classifying the secondary data.

A second parameter stored in the column 44 is defined by the width plus height, and represents the size of the region. In the case of noise, the value of the second parameter becomes smaller than that of other memo data. Therefore, the noise can be discriminated from the memos. A third parameter stored in the column 45 represents a ratio of black picture elements that occupy the area of the region in the original image 12 at a position that corresponds to the region. The box or surrounding mark contains the original image that exists in the corresponding region. Therefore, the third parameter has a large value; i.e., the value is small in the case of other memo data. Namely, the box or surrounding mark can be discriminated from other memo data. FIG. 9 is a flow chart of a program for classifying the memos using the abovementioned parameters, wherein $Q_{43}$ to $Q_{45}$ denote threshold values of the first to third parameters. In the foregoing description, only three kinds of memo data were taken into consideration, i.e., underline, box or surrounding mark, and notes. Depending upon the kinds of memos to be employed, however, other discrimination parameters should also be taken into consideration. For instance, areas and space frequencies can be utilized. The results of classification are stored in the column 46 of the table TB1.

The secondary data file for retrieving the document image is then prepared based upon the memo data that is classified as described above.

Figure 10A:
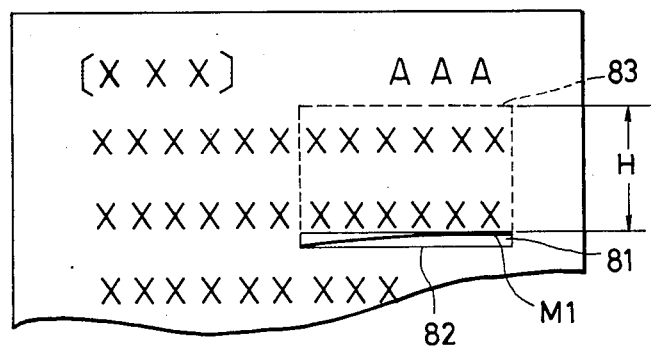
FIGS. 10A and 10B are diagrams illustrating a method of extracting a local region designated by an underline.
Figure 10B:
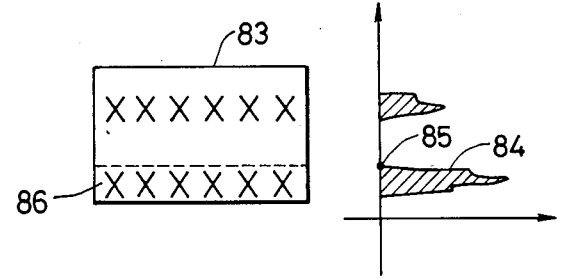

For instance, the underline M1 is presumed to be a sign that is drawn under the keywords in a sentence, and a train of characters above the underline in the document image is cut out so as to be used as retrieval data. To cut the train of characters designated by the underline, a rectangular region 83 having, as a base, the base 82 of a circumscribing rectangle 81 of the underline M1 and having a predetermined height H, is set in a processing region on the original image 12 or on the image 13 with frame as shown in FIG. 10A. The image in the rectangular region is then projected in the lateral direction as shown in FIG. 10B in order to find a distribution 84 of black picture elements. From this distribution, a boundary 85 of character train 86 of the lowermost line in the rectangular region 83 can be found, thereby to obtain the position and size of the local region where the character train 86 exists.

The box or surrounding mark M2 can be treated as a sign that represents the number of an important drawing quoted in the document. In this case, characters in a local region in the original image specified by the circumscribing rectangle of the box or surrounding mark are recognized. The recognition can be performed by adapting a variety of algorithms that have heretofore been used with the existing OCR apparatus, or can simply be performed by the method of pattern matching disclosed in the aforementioned literature compiled by the Japanese Association of Electronic Communications, p. 98. The recognized result is used as retrieval data together with a pointer from the sentence to the drawing number, as has been disclosed, for example, in Japanese Patent Application No. 273460/1984 entitled a system for retrieving document image data, filed by the same applicant as the present application.

The note M3 is extracted as a circumscribing rectangle on the divided-region table TB1 with a character as a unit. In order to collect a series of characters into a local region, therefore, the neighboring rectangular regions are collected together. This process is realized by expanding the individual circumscribing rectangles at a predetermined ratio, and collecting the regions that are overlapped into one.

FIG. 11 shows a data format of the thus extracted secondary data file 90, wherein reference numeral 91 denotes a code data such as image number that serves as a pointer to the original image, and reference numerals 92, 93, and 94 denote columns for storing the secondary data that correspond to the note M3, underline M1, and box or surrounding mark M2. A coordinate ($x_0$, $y_0$) represents a position at the left upper corner of a circumscribing rectangle of the memo data, a coordinate ($x_1$, $y_1$) represents a position at the right lower corner of the same rectangle, and P denotes a pointer to the note image. The note image does not exist in the file of the original image but is obtained from the processed image, and is stored in a separate memory region in the filing apparatus 5 in which the original image has been stored, or is stored in a separate memory region in the filing apparatus 5' which forms the secondary data file 90. A coordinate ($x_2$, $y_2$) represents a position at the left upper corner of a character train rectangle 86, a coordinate ($x_3$, $y_3$) represents a position at the right lower corner of the same rectangle, a character code 95 is obtained by recognizing a character in the character train specified by the box or surrounding mark M2, and a column 96 is an area for storing pointers that indicate the correspondence to the drawing images designated by the box or surrounding mark M2. In a stage where the drawing number specified by the box or surrounding mark M2 is recognized from the document image, the column 96 of pointers remains blank. Namely, the image data that has been stored is searched successively, and the image number is stored as a pointer in this column 96 at a moment when the image of the corresponding drawing is found.

The data in the secondary data file 90 consists chiefly of coordinates that specify the local region in the original image. When the document image is to be retrieved, the local region is extracted from the document image based upon the coordinate data to display the contents thereof. Since the amounts of secondary data corresponding to the document images are not so large, the secondary data file 90 may be comprised of a magnetic memory device having a relatively small memory capacity, i.e., may be comprised of a filing device 5' such as a floppy disc, that is separate from the filing device 5 of a large capacity such as an optical disc which stores document images. The secondary data may be stored in the file 5' consisting of an optical disc, as a matter of course. In the above-mentioned embodiment, furthermore, the local region designated by the underline M1 is stored by way of position coordinates, and the contents of the local region are extracted from the file of original images. This, however, may be so modified that a keyword contained in each of the local regions is stored as a character code in the column 93 of the secondary data file, and is used for attaining the matching with respect to a designated keyword at the time of retrieving the image. In the above description, the underline was a cut out mark, and the box or surrounding mark was a recognition mark. It is, however, also allowable to define the underline as a recognition mark and the box or surrounding mark as a cut out mark. Further, in the foregoing there was described a method to recognize the drawing number. However, it is also allowable to recognize the literature number, to cut out the name of the corresponding literature from the end of the literature, in order to store and display it. It is further possible to provide a correcting function relying upon interactive processing to cope with the situations where the classified results are not correct.

Described below is a method of retrieving the document image according to the present invention by utilizing the contents of the above-mentioned secondary data file.

FIG. 12 shows a retrieval screen displayed on the CRT 9 in retrieving the document image, wherein reference numeral 50 denotes an ordinary retrieval screen which depicts the results of when a classification code is designated. If the user requests the display of an underlined portion under the condition where the data such as the name of document or its number has not been clearly stored, the underlined portion only is displayed with a document as a unit as designated at 51 in FIG. 12. Further, if the user requests a display of the drawings or the notes, the contents are displayed as designated at 52 or 53 in FIG. 12. The drawing numbers have been recognized and corresponded related to the description. Therefore, the retrieval system of the aforementioned application that has been filed already can be utilized to compare the description with the drawings after the retrieval to display them. It is allowable to display, at the time of retrieval, a plurality of kinds of memos in the form of a list as a matter of course.

Figure 13:
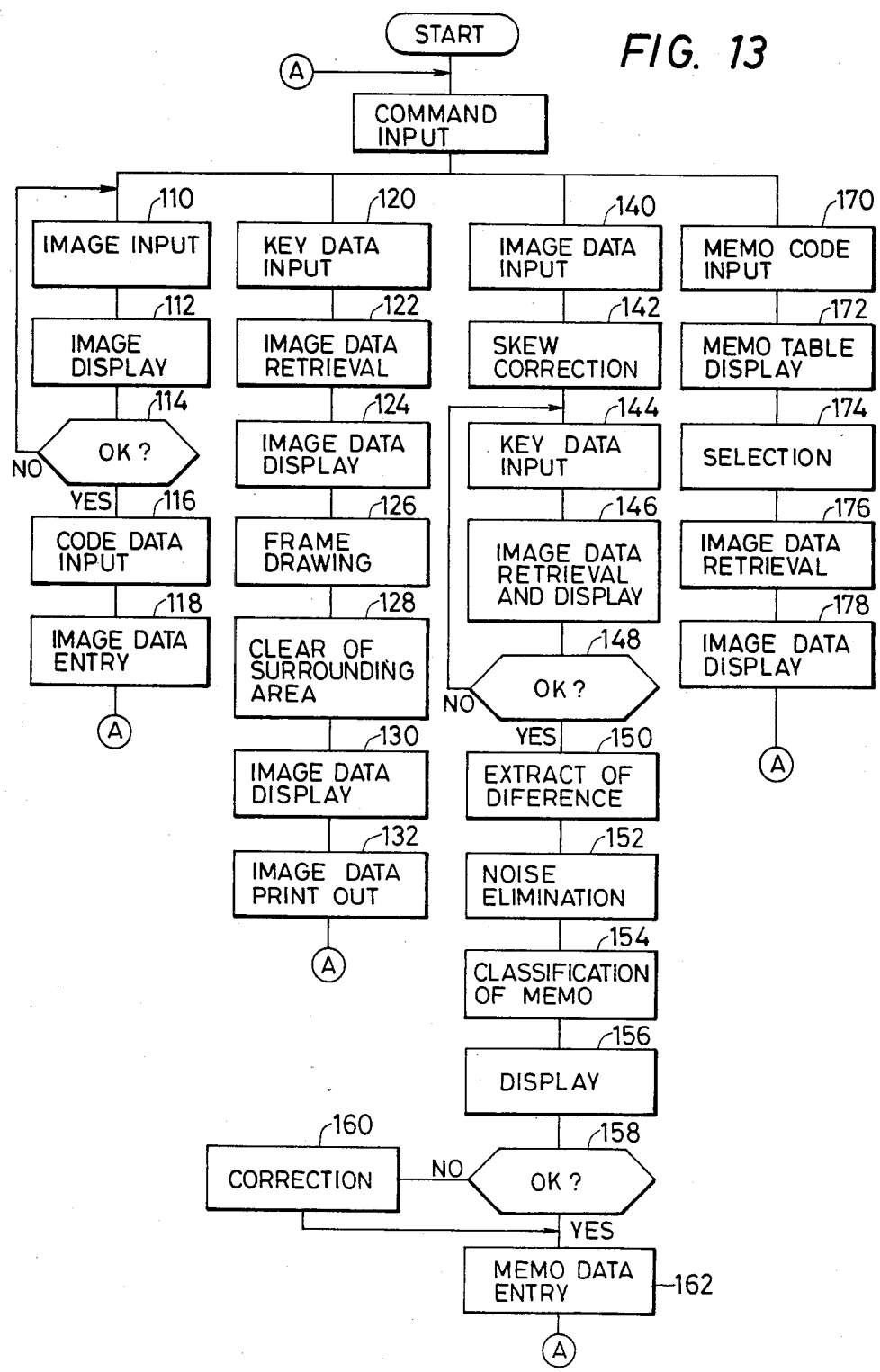
FIG. 13 is a program flow chart which schematically illustrates the whole functions of the image processing system according to the present invention.

FIG. 13 shows a whole procedure for storing and retrieving the document image data executed by the document image processing system of FIG. 1. The image processing can be roughly divided into four processes that are executed depending upon the command inputs (step 100) sent from the keyboard 3.

A first process is to store a document image through steps 110 to 118. In the step 110, the image of the original document is input from the image scanner 4 to a predetermined area in the bit map memory 6, and the input image is displayed on the CRT 9 (step 112). If the input image is not perfect, and the operator instructs to input the image again, the process returns to the step 110. The operator who has confirmed the image quality then inputs the document number corresponding to the document, classification code and keyword (step 116) using the keyboard 3. The input document image is therefore stored in the filing device 5 together with these codes.

A second process is to print out the original paper for a processed document through steps 120 to 132. As the document number or the keyword is input (step 120) through the keyboard 3, a corresponding document image is retrieved (step 122) out of the documents stored in the filing device 5, read into the bit map memory 6 and is displayed on the CRT 9 (step 124). To the document image is added a rectangular frame FR (step 126) to indicate the reference position mentioned earlier. The region surrounding the rectangular frame is cleared (step 128), and the document image is sent as an image with frame to the CRT 9 and the printer 10 (steps 130 to 132).

A third process is to store the secondary data through steps 140 to 162. In this process, a processed document consisting of the document with frame produced previously and onto which is writen memo data, is input from the image scanner 4 (step 140), the skew is corrected and, as required, the size is corrected (step 142). Next, as the operator inputs the document number or the keyword of the document, the corresponding original image is retrieved from the filing device 5 and is displayed (steps 144 to 146). If the memo data and the original correspond to each other, the memo data is extracted and classified through steps 150 to 156, and the results are displayed. If the operator who has confirmed the diplayed contents inputs an OK sign, the memo data is stored in the aforementioned secondary data file 5' (step 162). If the displayed contents are not correct, the error is corrected at a step 160, and the corrected result is stored in the secondary data file.

A fourth process is to retrieve the document image through steps 170 to 176. As the operator designates the classification code of memo data, the document data file 5 is accessed in accordance with the data of a corresponding classification section in the secondary data file 5'. For example, the image of a local region in the document corresponding to the underline is displayed in the form of a list (step 172). When the "note" is designated, the image of note characters are read out from a separate region of the secondary data file 5', and is displayed in the form of a list. If the operator selects any one of the memory data (step 174) with reference to the contents of the list that is displayed, the document image of a corresponding image number is retrieved from the file 5, and is displayed on the CRT (steps 176 and 178).

Figure 14:
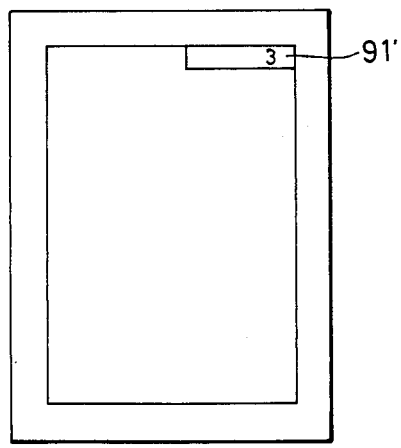
FIG. 14 is a diagram showing a modified form of the original document used for writing the secondary data.

In the above-mentioned flow chart, the operator inputs the image number of the original image in storing the secondary data. This, however, may be eliminated by automatically outputting the image number 91' to the processed document in the second process as shown in FIG. 14, and by automatically recognizing the image number 91' at the step 144. In the above embodiment, the secondary data is displayed depending upon the kinds of data. However, the system may be so designed that two or more kinds of secondary data are displayed simultaneously.

According to the present invention as will be understood from the foregoing description, the user stores the notes written onto the document, as well as principal words and sentences in the document specified by a mark such as an underline, in the form of secondary data and memo data that are to be retrieved. Therefore, even when the user does not remember the correct name of the document or the keyword or even when he remembers them vaguely, the desired document can be efficiently retrieved with reference to the secondary data file. By utilizing the secondary data, a plurality of documents can be displayed at one time in a compact form, making it possible to greatly reduce the time for retrieval compared with the method by which the contents of the whole documents are successively displayed and retrieved one by one from the file of the original documents. Moreover, each user is allowed to possess the secondary data file as his own file and is, hence, permitted to store and utilize his own memo data irrespective of other users. In the above embodiment, although the document file 5 is made up at the user side through the first process, an existing document file supplied by a publishing firm may be available to produce the original paper 14.

What is claimed is:

1. A method of storing document data in a filing system comprising the steps of:
    (a) storing data representing a processed image, which includes the content of an original document, and secondary data added to the document in a first memory region of said filing system;
    (b) comparing the processed image as stored in said first memory region with the image of the original document in order to detect portions which differ in respective images;
    (c) classifying the portions which differ as detected in the comparing step (b) according to predetermined classification standards;
    (d) specifying at least one local region of said processed image which has a predetermined relationship in position that is determined by a selected classification standard with respect to the portion which differs in the processed image; and
    (e) storing the data that represents said local region in a second memory region of said filing system as retrieval data together with a code that indicates the relationship of said retrieval data to said original document.

2. A method of storing document data in a filing system according to claim 1, wherein said retrieval data contains position coordinates of the local region.

3. A method of storing document data in a filing system according to claim 1, wherein said retrieval data is image data contained in said local region of the original image.

4. A method of storing document data in a filing system according to claim 1, further comprising:
    discriminating characters contained in said local region to convert them into character codes which will be stored in the second memory region in the storing step (e).

5. A method of storing document data in a filing system according to claim 1, wherein said retrieval data is stored during the storing step (e) in said second memory region for each of the classifications determined in the classifying step (c).

6. A method of storing document data in a filing system according to claim 1, wherein said secondary data includes a mark that is applied onto the document to designate said local region.

7. A method of storing document data in a filing system according to claim 6, wherein said mark consists of a marking line for designating a local region that includes a plurality of characters in the processed document.

8. A method of storing document data in a filing system according to claim 6, wherein said mark consists of a frame that surrounds a plurality of characters in the processed document.

9. A method of storing document data in a filing system according to claim 1, wherein said secondary data contains a word in the processed document that consists of a plurality of characters.

10. A method of storing document data in a filing system according to claim 9, wherein said secondary data contains a mark that is applied onto the document to designate said local region.

11. A method of storing document data in a filing system according to claim 1, further comprising:
    preparing a document to write said secondary data in a form in which at least one indication to indicate a reference position is added at a predetermined position of an image read from said first memory region; and
    determining and correcting the skew of a processed image that contains the indication of said reference position, relying upon the indication of said reference position in said image;
    wherein the image after being corrected is compared with the original document image in the comparing step (b).

12. A method of storing and retrieving document data in a filing system according to claim 1, further comprising the steps of:

(f) designating a classification standard;

(g) reading out from said secondary memory region and displaying in the form of a look-up table retrieval data that represents each local region determined by said designated classification standard; and (h) retrieving from said first memory region processed image data corresponding to a selected retrieval data being displayed.

13. A method of storing and retrieving document data in a filing system according to claim 12, wherein said step (g) comprises displaying plural retrieval data simultaneously.

14. A method of retrieving a desired document image out of document images stored in a filing apparatus, comprising the steps of:

(a) preparing a file of secondary data by extracting additionally written matters from a processed image that consists of the contents of an original document image stored in said filing apparatus and said additionally written matters, said file storing the secondary data as retrieval data together with codes that indicate a correspondence of the secondary data to the original document image, said secondary data being classified into different kinds of said additionally written matters;

(b) designating at least one portion of the secondary data stored in said file;

(c) displaying the secondary data stored in said file that corresponds to said designated portion;

(d) specifying a document image that is to be read out from the filing apparatus with reference to the secondary data that is displayed; and (e) reading out the specified document image from the filing apparatus.

15. A method of retrieving a desired document image out of the document images stored in the filing apparatus according to claim 14, wherein said secondary data contains data that specifies a local region of the original document image, and the image of said local region is displayed in the specifying step (d).

16. A method of retrieving a desired document image out of the document images stored in the filing apparatus according to claim 14, wherein said additionally written matters include marks and notes for designating part of the regions in the original document image, said secondary data contains coordinate data for specifying part of the regions of said original document image corresponding to said marks and contains a local image that includes said notes, and wherein when a section portion corresponding to said mark is designated in said step (b), part of the regions of the original document image is extracted and displayed relying upon said coordinate data.

* * * * *